United States Patent [19]
Smorenburg

[11] 3,970,188
[45] July 20, 1976

[54] CARRIER ELEMENT FOR A HYDRASTATIC COOKER

[75] Inventor: Johannes Jacobus Smorenburg, Abcoude, Netherlands

[73] Assignee: Stork-Amsterdam, B.V., Amstelveen, Netherlands

[22] Filed: Sept. 14, 1973

[21] Appl. No.: 397,588

[30] Foreign Application Priority Data
Sept. 19, 1972 Netherlands.................. 7212656
Sept. 19, 1972 Netherlands.................. 7212657
Sept. 19, 1972 Netherlands.................. 7212658
Oct. 26, 1972 Netherlands.................. 7214534

[52] U.S. Cl.............................. 198/30; 198/131; 198/152; 99/360
[51] Int. Cl.².................................... B65G 47/26
[58] Field of Search ........... 198/131, 152, 140, 153, 198/154, 155, 158, 160, 163, 189, 34, 51, 30; 99/484, 360, 371

[56] References Cited
UNITED STATES PATENTS

| | | | |
|---|---|---|---|
| 737,195 | 8/1903 | Barry et al...................... | 198/131 X |
| 2,678,124 | 5/1954 | Bergmann............................. | 198/34 |
| 2,703,643 | 3/1955 | Parsons.......................... | 198/158 X |
| 2,708,998 | 5/1955 | Ulinski................................... | 198/51 |
| 2,729,531 | 1/1956 | Andersen........................ | 198/131 X |
| 2,772,005 | 11/1956 | Dubin et al...................... | 198/131 X |
| 3,462,003 | 8/1969 | Mencacci et al. .............. | 198/152 X |
| 3,543,908 | 12/1970 | Holland .............................. | 198/30 |
| 3,643,787 | 2/1972 | Woof et al....................... | 198/140 X |

Primary Examiner—Robert J. Spar
Assistant Examiner—James M. Slattery
Attorney, Agent, or Firm—Edmund M. Jaskiewicz

[57] ABSTRACT

Device for thermal treatment of articles such as tins containing foodstuff, comprising an overpressure treatment chamber and an endless conveyor traversing the chamber, in which the conveyor is provided with carrying elements consisting of two or more mirror-symmetrically positioned carriers secured to an endplate at both extremities, the endplates permitting an easy mounting and dismounting of each carrying element to the conveyor.

11 Claims, 23 Drawing Figures

CARRIER ELEMENT FOR A HYDRASTATIC COOKER

BACKGROUND OF THE INVENTION

My invention relates to a device for thermal treatment of articles, like container packed wares, comprising a treatment space and an endless conveyor which, within this space, follows a looped path and, outside the space, traverses a charging and discharging station, the conveyor consisting of one or more chains provided with equidistantly spaced carrying elements for the articles to be treated.

Such a device and carrying elements to be applied therewith are known in various embodiments. Reference is made to Assignees U.S. Pat. Nos. 3,151,540; 3,163,284; 3,181,689; 3,211,275; 3,315,787 and 3,379,115.

My invention aims to realize a structural simplification, especially of the conveyor, such that the functioning of this conveyor is entirely independent of the other parts of the device and particularly of the wall of the various spaces traversed by the conveyor. It is often necessary to observe a particular maximal distance between the carrying elements and the wall and to dispose special guide plates in the curves in order to prevent the articles from leaving the carrying elements. This results in complications, partially because of the fact that a varying extension occurs to the conveyor chain, particularly in the lower parts of the path.

DISCUSSION OF THE PRIOR ART

According to the state of the art many versions of carriers are known for temporarily accommodating containers like cans, glass or plastic bottles, and jars, respectively, in order to carry these articles through the treatment space of an installation for continuously sterilizing or pasteurizing the contents of these containers.

There is a need of a certain type of carrying member on the one hand being very compact and on the other hand ensuring the best possible confinement of the containers in order to avoid trouble when the conveyor follows a looped path, which is mostly the case, in the treatment space. It is moveover of importance that each carrier is independent of any cooperation with the inner wall of the treatment space or with the guide partitions sometimes provided therein. It is furthermore important that once the containers are accommodated in the carriers they do not leave the same in a lateral direction owing to the floating condition which often occurs when the conveyor passes through a liquid bath or a liquid column.

SUMMARY OF THE INVENTION

According to my invention each carrier element is composed of two mirror-symmetrical carriers, in which each carrier has a substantially primatic shape in cross-section with a closed or almost closed cross-section, each carrier being secured near at least one end to a mounting plate which bears on two adjacent pivot pins of the conveyor.

A considerable advantage is that due to the shape of the carriers the articles cannot fall or float out of the carrier. The conveyor becomes entirely independent of the housing of the device which this permits a particular standardization in the construction of the housing. The relation normally existing between the conveyor and the housing will now be absent, which means that the same housing may be used for various conveyors. Inversely a different conveyor with other carriers can be employed in the same housing. Due to the absence of contact between the carriers on the one hand and the inner wall of the housing or the guide plates, on the other hand, there is no wear. A phosphate layer once applied and protecting against corrosion will be maintained. In the event of damage to a carrier the same can be replaced without dismounting the chain.

The aforementioned replacement of a carrier can be further simplified when the mounting plate is provided with a hole for the one pivot pin and with an inverted U-shaped opening for the other pivot pin, the part of the plate with the aforementioned opening being staggered with respect to the part of the plate with said hole, for a distance which is at least equal to the thickness of the plate.

Charging and discharging of the carriers is effected in the longitudinal direction thereof. The principle known from U.S. Pat. No. 3,151,540 can be applied according to which charging and discharging is effected by means of water. When the device according to the invention is provided with carriers with a not entirely closed cross-section, feeding and unloading of the articles by means of water can still be applied if at the discharge station a portable cover extending in the longitudinal direction of the carrier is available for temporarily closing the carrier to be discharged.

My invention also relates to a method for loading the above described installation, i.e. for periodically passing through a group of articles advanced in an almost continuous row, in which one article from the row is temporarily seized and retained, in order to obtain an interval with respect to the last article of the preceding group. Such a method is performed when from a continuously advancing row of articles, periodically a group should be separated to perform treatment thereon. When the rate of treatment increases, sometimes problems occur owing to the fact that the seized article cannot be sufficiently retained. This happens for example, because the article has already advanced to such an extent that only the rear part can be seized. When this article gets loose prematurely trouble may occur since the article then "strays" between two consecutive groups.

My invention aims to solve this problem by the arrangement that a passing article is held at two locations, situated close after another — as seen in the direction of movement — with a short difference in time, said time difference being smaller than time lapse in which an article moves from the first to the second location. Due to these features it is assured that an article is held at any rate and that each group of articles does not exceed the predetermined maximum number. This number is adjusted by the ratio between the rate at which the articles are being advanced on the one hand and the frequency with which a passing article is seized and held on the other hand.

My invention moreover relates to a method for the discharging of the above described installation, i.e. to the transformation of groupwise supplied rows of articles (so-called sticks) advancing along parallel paths into an uniformly advancing single row of articles, like this. My invention relates particularly to the treatment of articles which are discharged from the above described installation. In that example the article become available at particular intervals which hampers the further treatment like packing and despatch.

It is an object of my invention to provide a method in which rows of articles supplied in groups are united to a single, entirely or almost entirely, continuous row. This object is attained by the arrangement that with a periodical supply each $t$ seconds simultaneously along $n$ parallel paths of rows having 1 meter in length, always $n$ successive rows per path are collected to form a serried row, and in that after each groupwise supply of the articles alternately always on one of the paths all available articles are conveyed with a velocity substantially equal to $(n.l./t)$ m/sec. towards a common discharge path.

Due to these measures the supplied rows of articles are temporarily parked and only then discharged when a total length is obtained which amounts to as many times the length of a single row as there are parallel paths. Consequently at the one end of the path there is always periodically a row of articles supplied, while at the other end of each path once per $n$ periods an accelerated discharge of the collected articles is achieved in a period which entirely or for a considerable part lies in the interval of rest between two successive periods of groupwise supply.

SURVEY OF THE DRAWINGS

FIG. 1 is a vertical section through a complete device;

DESCRIPTION OF PREFERRED EMBODIMENTS

As is shown in FIG. 1 the device consists of a treatment space 1, a supply column 2 and a discharge column 3 enclosed by parts of a housing 4. Within this housing an endless conveyor 5 is disposed following a looped path within space 1. In the left part of the housing 4 a charging and a discharging station 6 and 7 are provided. The construction of this device, insofar as essential in this connection, does not differ fundamentally from the devices according to the aforementioned Patents.

Figure 2:
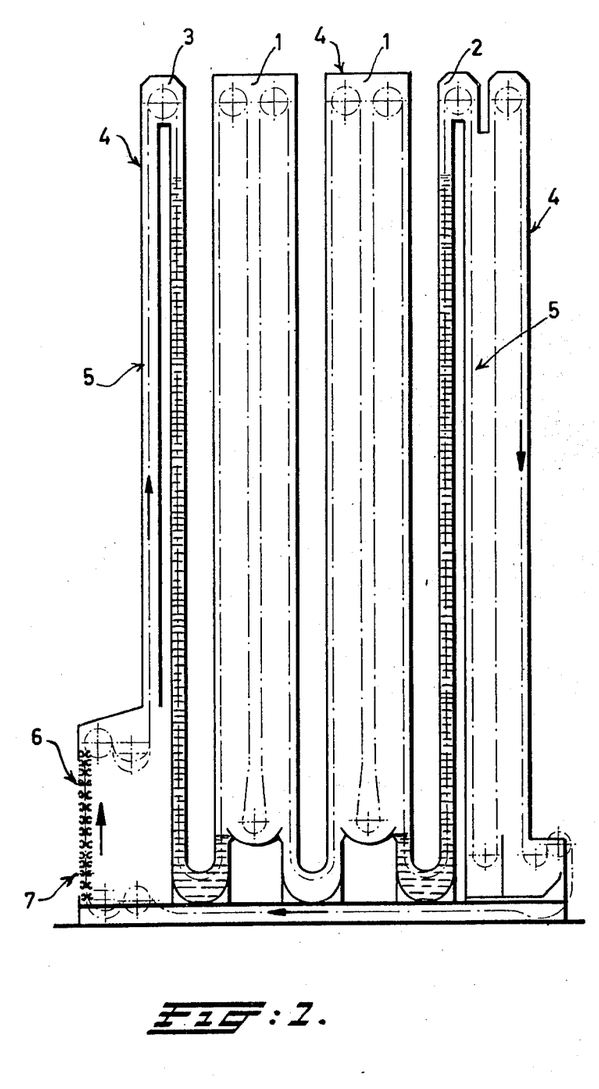
FIG. 2 is to an enlarged scale a perspective view of a first embodiment of a carrier of the device according to FIG. 1.
Figures 2, 3:
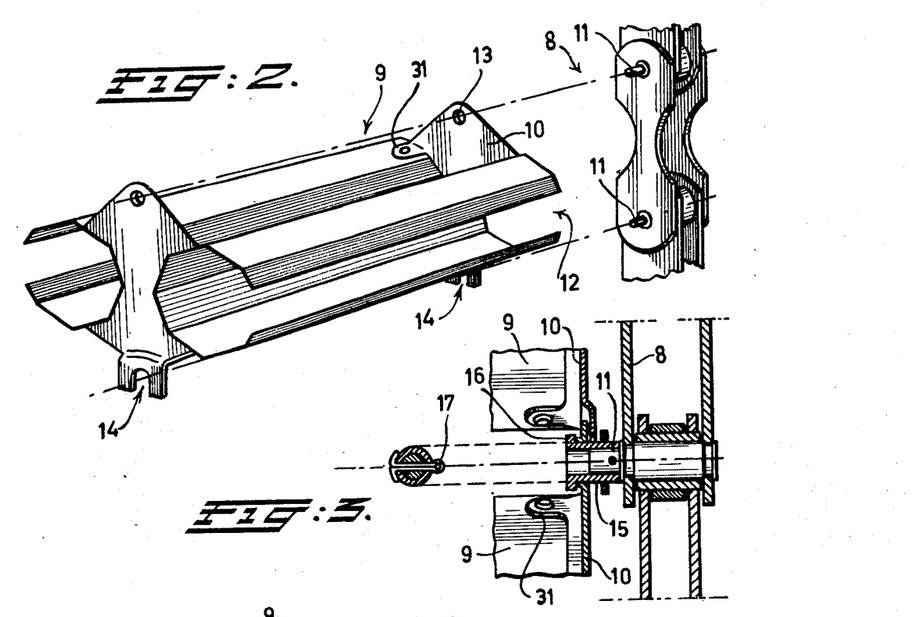
FIG. 3 shows the securing of one end of the carrier to a chain of the conveyor.

The conveyor 5 consists in the embodiment described of two chains 8 (see FIGS. 2 and 3) between which carriers 9 are disposed at regular intervals. These carriers serve to accommodate articles like containers packed wares (e.g. cans). In the embodiment according to FIGS. 2 to 6, 8 and 9 two carriers 9 are always secured in juxtaposition by their ends to a mounting plate 10.

The latter bears on two adjacent pivot pins 11 of the conveyor chain 8. Each carrier 9 has a substantially prismatic shape with a cross-section which in the embodiment according to FIG. 9 is entirely, but in the other embodiments almost closed, that is to say is provided with a narrow opening 12 extending in longitudinal direction.

Each mounting plate 10 is provided with a hole 13 for a pivot pin 11 and an opening 14 of inverted U-section for the other pivot pin. The part of the plate with the opening 14 is staggered, for a distance which is about equal to the thickness of the plate 10, with respect to the part of the plate comprising the hole 13 (see FIG. 3). Mounting is effected by means of a sleeve 15 with a collar 16 fitting around the protruding part of pivot pin 11. The diameter of hole 13 corresponds to the outer diameter of sleeve 15. As is apparent from FIG. 3 securing is achieved by sliding sleeve 15 through hole 13 of a first mounting plate, through opening 14 of an adjacent mounting plate and subsequently around shaft 11. Securing is completed by means of a split pin 17.

Figure 4:
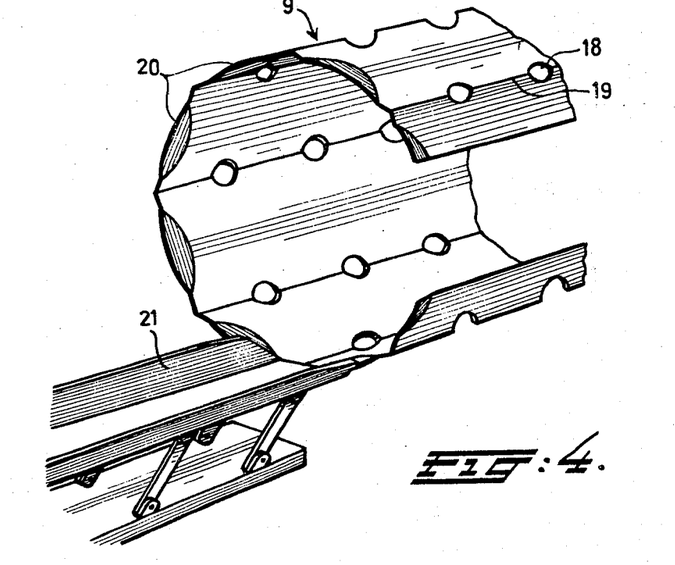
FIG. 4 shows to a still further enlarged scale a second embodiment of the carrier.

FIG. 4 shows that each carrier 9 is perforated on the ribs 19. The location of the perforations 18 along the ribs 19 prevents the edge of the folded seam of a container from catching on the rim of the perforation or striking the same. The perforations assist in the passage and distribution of water and enhance transfer of heat. At its end each carrier is provided with one or more bulges 20 positioned such that, when the carrier passes through the charging station 6 such a bulge is situated in an area constituting the lower supporting side for the articles. In this manner the edge of the folded seam of the containers (cans) is prevented from abutting against the side opening of the carrier. For troublefree charging it may be advisable to provide a movable table 21 bridging the distance between the path along which the articles are moved forward and the carrier 9.

Figure 5:
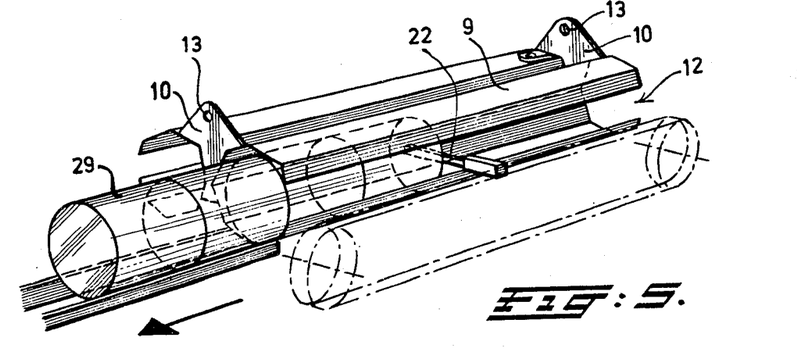
FIGS. 5 and 6 show two manners in which articles are removed from the carrier.
Figure 6:
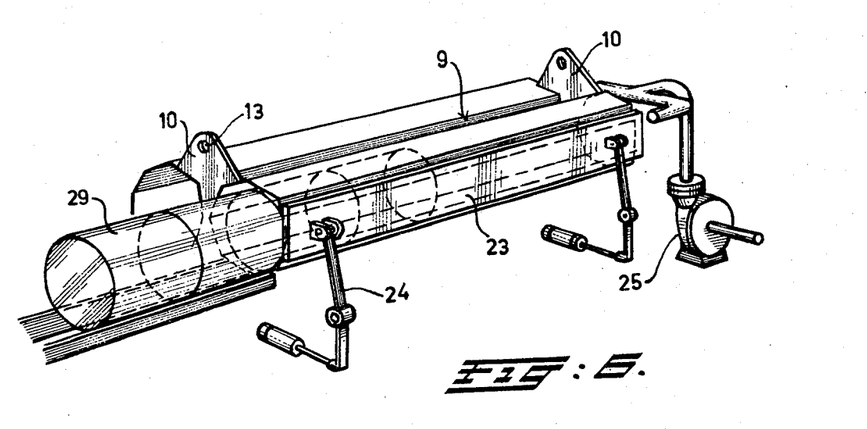
Figure 9:
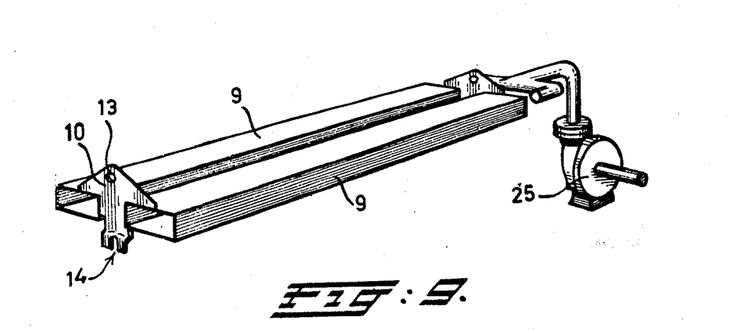
FIG. 9 shows another embodiment of a carrier.

The carriers 9 can be unloaded in various manners, some of which are shown in the FIGS. 5, 6 and 9. According to FIG. 5 a pushing finger 22 is provided which moves through opening 12 of carrier 9. At the discharging station 7 a cover 25, extending in the longitudinal direction of the carriers 9, may be available. This cover is arranged such that via some levers 24 it is movable and capable of temporarily closing opening 12 of carrier 9 to be unloaded. The discharge of the articles can then be effected with water via a pump 25 in a manner as described in principle in U.S. Pat. No. 3,151,540. When the carriers 9 are entirely closed (see FIG. 9) cover 23 is superfluous.

Figure 7:
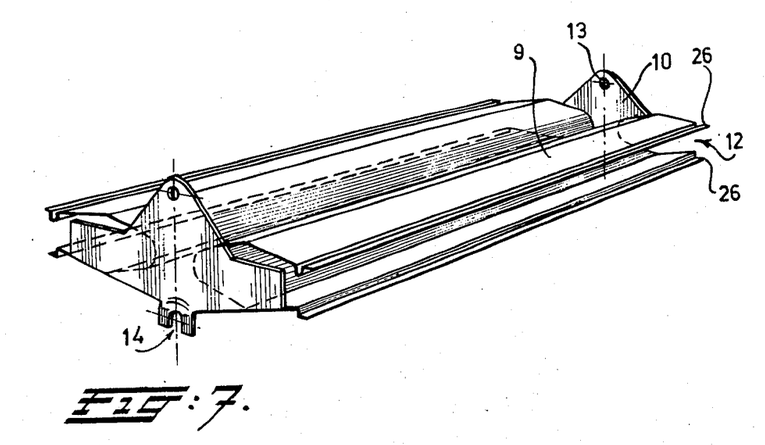
FIGS. 7 and 8 illustrate an embodiment of the carrier and the charging and discharging period performed in connection therewith.
Figure 8:
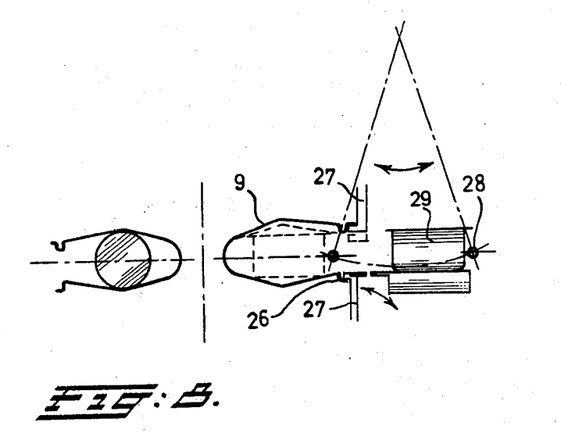

The embodiment according to FIGS. 7 and 8 is distinguished from that of the other drawings in that each carrier 9 is elastically deformable. For this purpose only the lower part is secured to the mounting plate 10. Along the opening 12 the carrier exhibits two lips 26 which are capable of cooperation with operating members 27 disposed at both the charging station 6 and the discharging station 7. FIG. 8 illustrates how each carrier 9 can be temporarily pulled open in order to allow for charging and discharging of articles. The FIGS. 7 and 8 show both a so-called frontal-loading by a pusher beam 28. Axial loading as indicated in the preceding Figures is, however, also applicable in this case.

The latter embodiment is advantageous in that the articles 29 can be clamped in the carrier 9. In this connection it should be noted that the articles will not bar perforations 18 (see FIG. 4) which is due to the polygonal shape of the carriers 9. This shape provides a stable position of the articles (containers) in the carriers. An expansion of the containers owing to internal overpressure can be dealt with by the carriers without jamming or damage. Per link or composite element eventually two or more carriers of different shape may be provided.

The construction of the composite element will now be more extensively described. Each composite element contains two parallel polygonal carriers 9 which are secured to two end plates 10 in a mirror-symmetrical manner with respect to each other.

Figures 11, 12, 13:
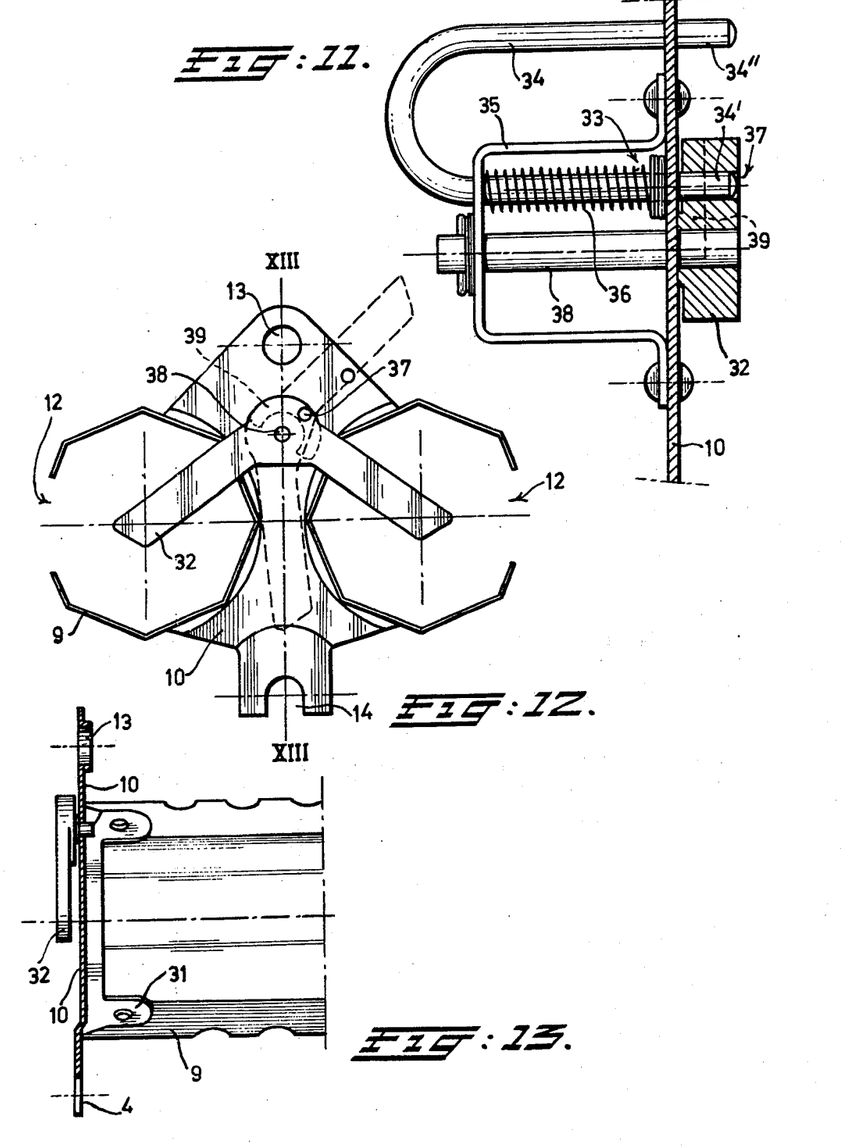
FIG. 11 is a view according to the arrow XI of the locking member from the carrying member according to FIG. 10.
FIG. 12 shows an end view from the outer side of a modified embodiment of the carrying member according to FIG. 10.
FIG. 13 is a section on the line XIII—XIII in FIG. 12.

The carriers 9 may have an entirely closed cross-section, but often possess a longitudinally extending narrow opening 12 (see FIG. 12) through which a pusher finger can move for pushing the containers from each carrier. The end plates 10 are centrally narrowed with respect to the dimensions in other parts of this plate. At one end the plate has an eye 13 and at the other end a fork-shaped opening 14. The end plates 10 can be easily secured herewith to the slightly elongated studs of chains (not shown) constituting a conveyor for e.g. a continuous sterilizer. The carriers 9 are secured to the end plates 10 by means of some protruding lips 31 as is best seen in FIG. 13.

Figure 10:
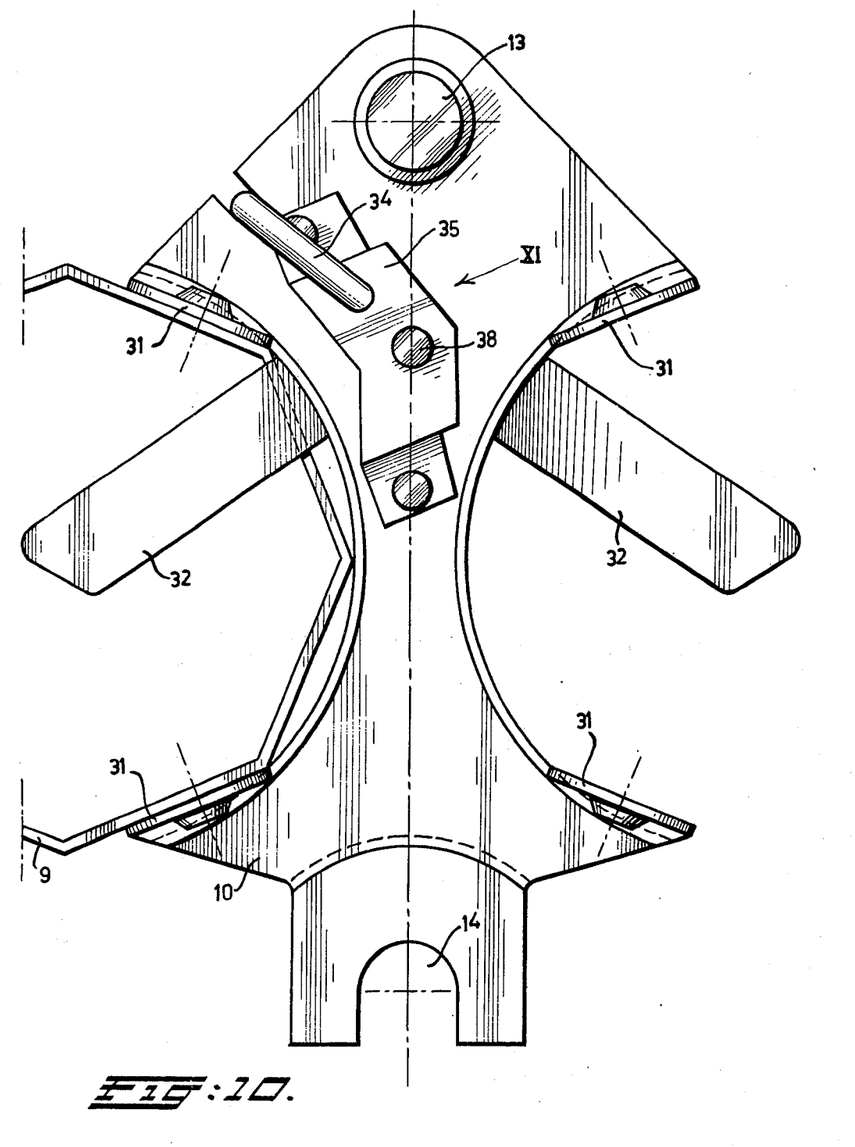
FIG. 10 is a view of one end of a carrying member as seen from the interior.

The cross-section of the carriers 9 is such that the containers temporarily staying therein (such as preserves, tins or glass and plastic bottles) are almost or entirely surrounded. Only at the ends of the carriers the containers can enter or leave. This is necessary for charging and discharging. When the conveyor follows its path on traversing the treatment space it is useful to also close the open ends of the carriers 9. A closing member 32 is disposed at the two ends for that purpose, which can be turned into an operative and an inoperative position and vice versa. The FIGS. 10 and 12 show this operative position in full lines and FIG. 12 represents the inoperative position in dotted lines. For maintaining the operative position a locking member 33 is disposed. The locking member consists of a U-shaped rod 34 the one end 34' of which cooperates with the closing member 32, while the other end 34'' protrudes from the path of composite element 9, 10 (see FIG. 11). The rod 34 is guided in a strap 35, while a spring 36 is provided pressing the end 34' of the rod 34 into a hole 37 of the closing member 32. Hereby this member is secured in its operative position. The strap 35 which is attached to the inner side of the end plate 10 supports also a shaft 38 constituting the centre of rotation of the closing member 32. As is best seen in FIG. 12 a groove 39, concentrial to the centre of rotation 38, is provided at the back side of the closing member 32. In this groove the end 34' of the rod can press in order to maintain the closing member in the inoperative position. The latter position is obtained by exerting pressure on the end 34'' of the rod 34 so that the end 34' leaves the hole 37 and the closing member can be turned towards the left or the right, the end 34' entering the groove 39. Due to the pressure of the end 34' in the groove 39 (as a consequence of the effect of the spring 36) the closing member is retained in its inoperative position, whereas it is still possible to turn this member in such a manner that in the operative position of the closing member, the locking member 33 snaps in again.

In the depicted embodiment the closing member 32 is V-shaped, so that the two sides of the V can extend sufficiently in front of the open ends of the carriers 9, while yet the centre of rotation 38 is in an area spaced from the narrowest part of the end plate 10.

The operation of the closing member 32 can be entirely mechanized. On approaching the charging and discharging station the end 34'' of the rod 34 comes into contact with a stationary abutment situated in the vicinity of the path of the composite element 9, 10 so that the locking member 33 is lifted and the closing member 32 can be turned from its active into its inactive position by means of a second abutment. After discharging the treated containers and subsequent charging new containers, the closing member can again be returned by means of a stationary abutment, the end 34' of the rod 34 sliding along the groove 39 until this end snaps into the hole 37. During the further part of the path of the composite element 9, 10 through the device, the locking action is maintained and the articles in each carrier cannot leave the same.

The advantage of the provisions according to the invention is that with rather simple means it is possible to achieve a full confinement of the containers within the carriers and to prevent hereby a contact between a container protruding from the carrier and the inner wall of the device. The device according to the FIGS. 14 and 15 relates particularly to the loading of the installation and is provided to that end with a moving supply path 41 on which the articles 29 are being advanced. In this feed path 41 a stop member 42 is disposed consisting of two pairs of clamping jaws 43 and 44. In the drawing double embodiments are shown that is to say there are two feed paths 41 and therefore also two times two pairs of clamping jaws 43 and 44. Each pair of jaws is provided with an operating member 45 which is connected with regulating means (not shown). Each pair of clamping jaws is normally open so that the articles 29 can move from between. At the end of the feeding path 41 a movable abutment 46 is disposed. The direction of movement of the articles 29 is indicated by the arrow P.

The operation of the device described so far is as follows: The articles 29 are supplied in an almost continuous row and the stop member 42 should ensure that a group of articles is regularly let through. For that purpose the stop member 42 is periodically activated, so that an article from the row is temporarily seized and retained. The articles already passed are stopped by the abutment 46 and an interval is obtained between the article which has been let through last, and the article seized by the stop member 42.

As the stop member 42 consists of two pairs of clamping jaws 43 and 44 firstly the pair of clamping jaws 43 is operated and thereupon the second pair of jaws 44 with a small time lag. The aforementioned difference in time is smaller than the lapse of the time in which an article 29 moves from the first pair of clamping jaws 43 towards the second pair of jaws 44. At a rate of advance $v$ of the articles 29 and a distance s centre to centre of the two pairs of clamping jaws the aforementioned difference in time $\Delta t$ can be expressed in the following ratio: $v.\Delta t < s$.

Due to the twin construction of the clamping jaws half-gripped articles or an article which has not been gripped by the first set of jaws will be entirely gripped by the second pair. In this manner it is ensured that a particular predetermined number of articles in the aimed group is not exceeded and that no troubles will arise in this connection. As soon as the situation depicted in FIG. 14 arises, the next phase depicted in FIG. 15 commences.

Figures 14, 15:
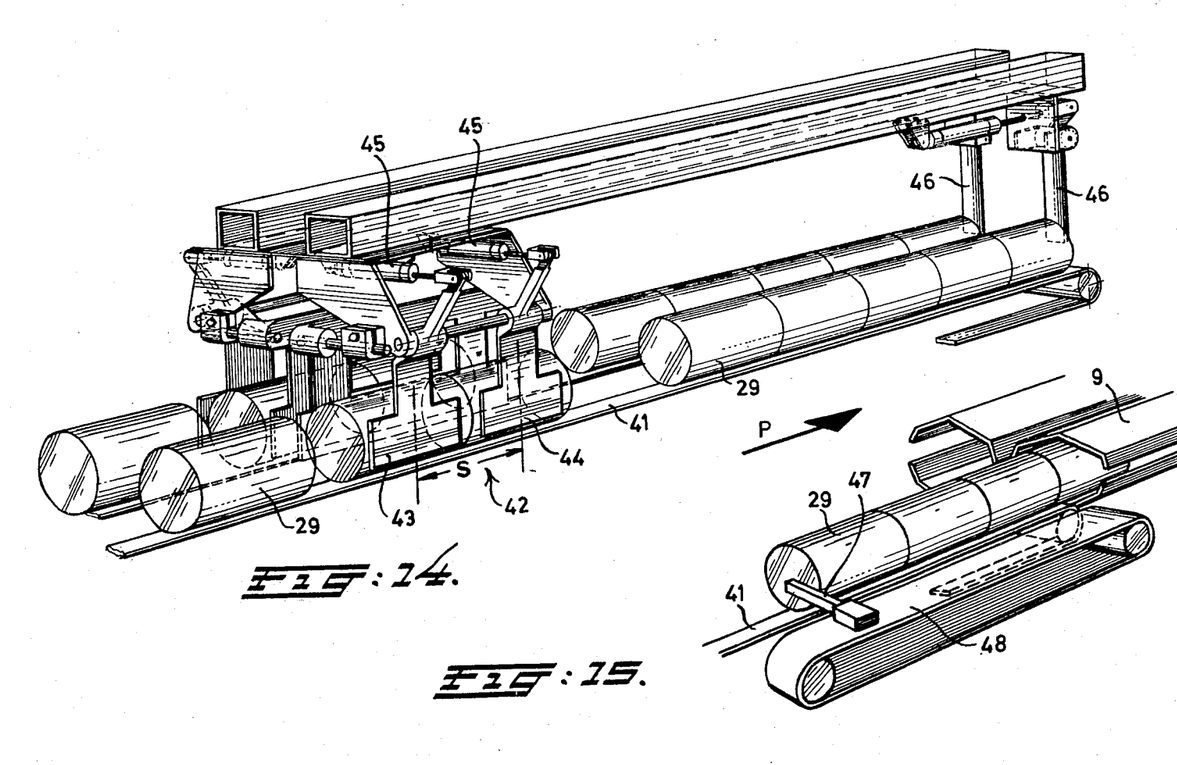
FIG. 14 shows a double embodiment of the loading device, wherein always groups of five cans are formed.
FIG. 15 shows a group of separated cans are slid into a carrier.

Just after the second pair of clamping jaws 44 is closed, the abutment 46 is lifted and the advancing feed belt 41 slides the first group of articles 29 into the carrier 9 of the conveyor (not shown). Simultaneously a pusher member 47 appears in the space between the clamping jaws 44 and the abutment 46. This member is mounted on an endless belt 48 moving at such a speed that all articles 29 are pushed from the feed belt and the abutment can again return to the operative position before the foremost article 29 of the group released by the stop member 42 arrives at the abutment 46. There may be a provision for swinging back the pusher member 47 through 90° such that this member is lying parallel to the belt 48 before the start and after the finish of its operative path.

In this manner a continuous supply of articles can be dealt with at a high rate and with a great uniformity as to the number of articles per group.

Finally the discharging of the above described installation will be described. To this end the discharging station 7 is provided with two parallel transit paths 49 (see FIGS. 16 to 22) which adjoin the periodically passing carriers 9 of the conveyor 5. Each transit path 49 has a length which is about as many times the length of a carrier 9 as this carrier can accommodate rows of articles 29. In this embodiment described each transit path 49 has therefore a length which is equal to twice the length of a carrier. At the end of each transit path 49 a movable abutment 50 is disposed. The first part of the transit path 49 adjacent to the device is provided with a table 51 adjoining a flat endless belt or mat 52 which moves at a faster rate than corresponds with the speed at which the articles are discharged from the carriers 9. This mat 52 covers likewise a discharge path 53 adjoining the transit paths 49. When the length of each carrier 9 and consequently also the length of each row of articles has a value of $l$ m, and every $t$ second a carrier 9 is discharged then the speed of the mat 52 is substantially equal to $(2.1/t/t)$ m/sec. two guide plates 54 are disposed over the common discharge path 53 by which means the supplied rows of articles are transformed to a single row. The discharge path 53 adjoins a slanting endless belt 55 along with the articles roll down in order to transform the initial position bottom against cover to side against side. This device 55 corresponds to and is described in U.S. Pat. No. 3,197,013.

Figure 16:
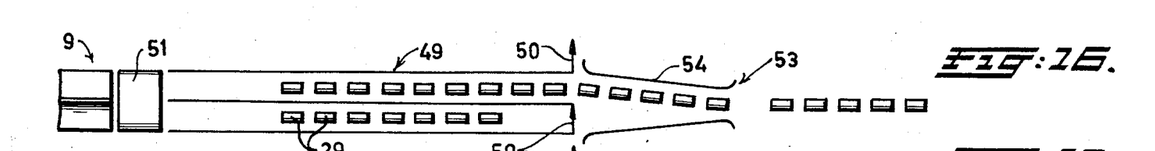
FIGS. 16 to 22 show consecutive stages of the method when applied to an installation with carriers, each of which is adapted to receive two rows of articles.
Figures 17, 18:
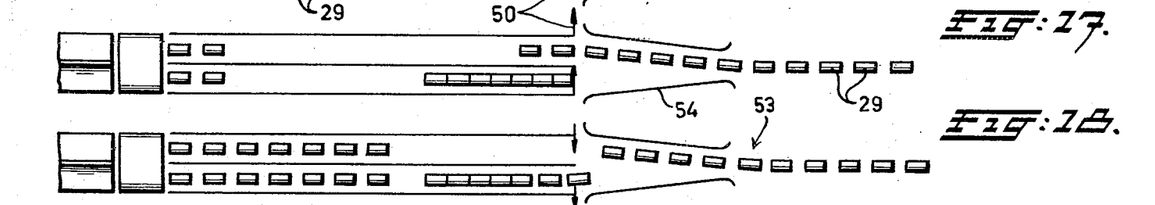
Figures 19, 20:
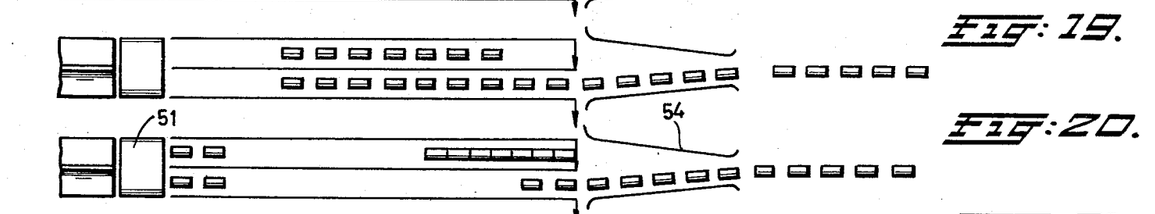
Figure 21:
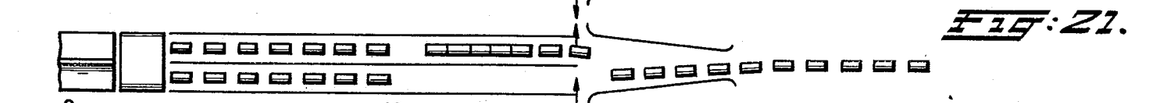
Figure 22:
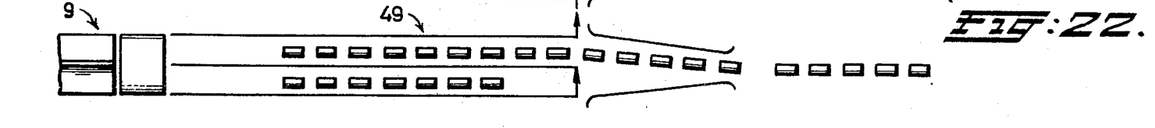
Figure 23:
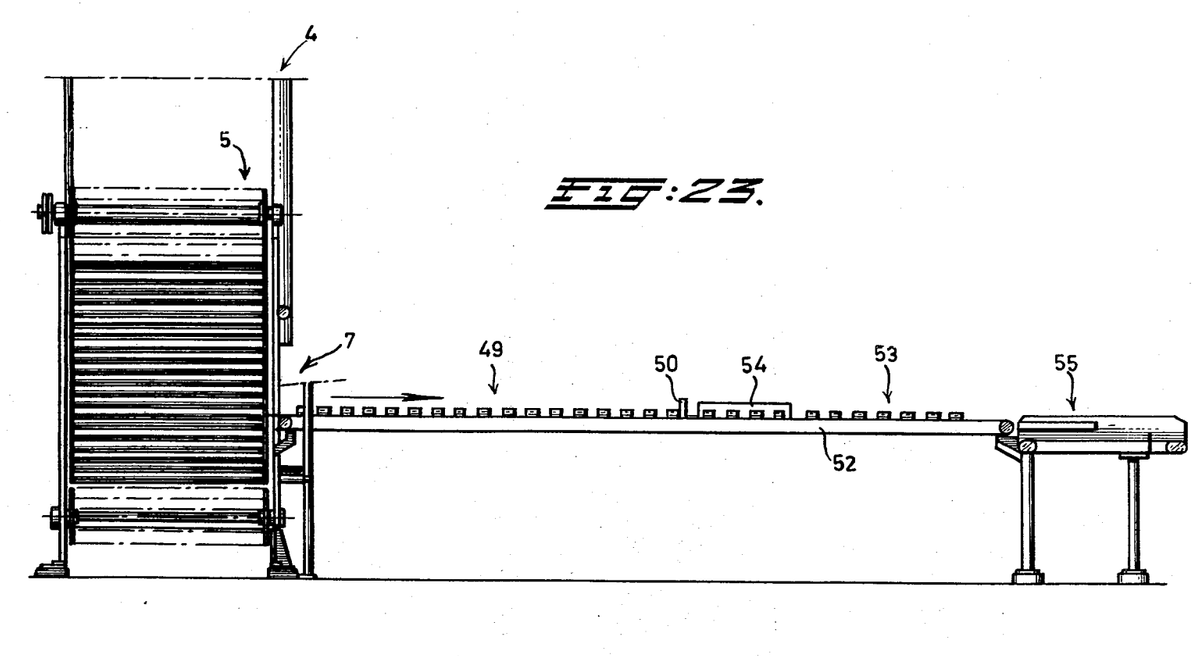
FIG. 23 is a side elevation of an installation provided with the means illustrated in the preceding Figures.

The method and progress of the transformation will be apparent from FIGS. 16 to 22. FIG. 16 represents the situation in which the abutment 50 of the upper path 49 (as represented in FIG. 16) is lifted and the articles 29 accumulated or parked on that path and the articles, if any, just discharged from the carrier are conveyed via the discharge path 53 to the slanting belt 55. About at the time between the moments as represented according to FIGS. 16 and 17 a carrier 9 arrives in front of the transit paths 49. The articles 29 in the carrier are pushed therefrom and land on the mat 52 of the transit paths 49. The completion of that phase is represented in FIG. 18. At that time the upper abutment 50 is shifted into position, since all articles taking part in the discharge movement have left the path 49. The lower abutment 50 is then lifted and the situation arises as shown in FIG. 19. The leading article from the lower path 49 joins about the last article from the upper path. While still a number of articles is present on the lower transit path 49 (FIG. 20) another filled carrier 9 arrives in front of the table 51 via which the contents of this carrier can be slid on the paths 49.

FIG. 21 shows again the moment whereat the discharge from the carrier 9 is completed and also the last article from the double row of the lower path 49 has passed by the abutment 50. This abutment is then again shifted into position and the upper abutment is released, so that another double row of articles is conveyed towards the discharge path 53 and the situation according to FIG. 22 arises. Herewith the entire cycle is completed and the situation according to FIG. 16 arises after which everything is repeated in an identical manner.

It will be clear that the method according to the invention allows a most uniform possible discharge in spite of the circumstances that always two rows of articles are simultaneously supplied in juxtaposition. This means that the further treatment of the articles is considerably simplified because the articles arrive in an almost continuous flow and are not delivered batchwise. It should be noted that the same system can be applied with threee or more parallel paths, provided in that case the length of the transit path 49 and the speed of the mat 52 are correspondingly related.

It should further be noted that the mat 52 may also consist of two parts, i.e. a part situated under the transit paths 49 and a part under the discharge path 55. The mat 52 may be constructed from stainless steel strips pivotally interconnected into an endless conveyor belt.

What I claim is:

1. A device for conveying containers along a looped path in the treatment space of a thermal treatment apparatus and traversing a charging and discharging station outside of the treatment space, comprising a pair of spaced endless chains each comprising a plurality of links pivotally interconnected by pivot pins having portions thereof protruding outwardly of their respective chains, a plurality of carrier elements to receive containers to be treated disposed at regular intervals between said chains, each carrier element comprising two parallel carriers positioned in mirror-symmetrical relation to each other, each carrier having a substantially polygonal cross section, and a mounting plate on each end of said carrier element, each said mounting plate being attached to the protruding portions of a pair of successive pivot pins on a said endless chain.

2. A device according to claim 1, in which the mounting plate is provided with a hole for the one of said pivot pins and with an inverted U-opening for the other of said pivot pins, the part of the plate with said opening being staggered with respect to the part of the plate with said hole for a distance which is at least equal to the thickness of the plate.

3. A device according to claim 1, in which each carrier at one end thereof has an outwardly bent portion in an area which when the carrier passes through the charging station constitutes the lower supporting side for the articles.

4. A device according to claim 3, in which the charging station contains a movable bridge piece, the end of which can bear in a said outwardly bent portion of a carrier.

5. A device according to claim 1, in which each carrier has an open cross-section, the charging station comprising a moveable cover extending in the longitudinal direction of the carriers for temporarily closing the carrier to be unloaded.

6. A device according to claim 1, each carrier having an open cross-section, and being elastically deformable, operating means in the charging-and/or discharging station for temporarily pulling open the carrier.

7. A device according to claim 1 and a closing member for the open ends of the two carriers, which member is movable from an operative into an inoperative position and vice versa a locking member provided for retaining the closing member in the operative position, said locking member consists of an U-shaped rod the one end of which cooperating with the closing member and the other end of which protruding from the path followed by the carrying member so as to be capable of operation by a stationary abutment.

8. An device according to claim 7, in which the closing member is V-shaped with a center of rotation in the bottom of the V.

9. A method for loading a device for the thermal treatment of articles, like container packed wares, comprising a treatment space and an endless conveyor which, within this space, follows a looped path and, outside said space, traverse a charging and discharging station, said conveyor consisting of one or more chains provided with equidistantly spaced carrier elements for the articles to be treated, each carrier element being composed of two mirror-symmetrical carriers, comprising the steps of advancing a plurality of articles axially in an almost continuous row, periodically seizing and retaining temporarily one article from the row, in order to obtain an interval with respect to the last retained article, such that advancing articles are held at two axially spaced locations, situated close after another—as seen in the direction of movement—the time different between seizing successive articles being smaller than the time lapse in which an article moves from the first to the second location and advancing the preceding group of articles in a row into a carrier.

10. A device for loading an apparatus for the thermal treatment of articles by supplying cans to step-wise moving carriers, comprising means defining at least one advancing feed path for the articles and a stop member at each path for temporarily holding an article advanced on the path concerned, the stop member consisting of two pairs of clamping jaws and each pair being provided with an operating member, regulating means being disposed for periodically activating the operating members of the clamping jaws at a difference in time which is less than the time lapse in which an article moves between said pairs of jaws, a movable abutment is spaced past the clamping jaws as seen in the direction of movement, and a pusher member is periodically movable into the space between the clamping jaws and the abutment, while the pusher member can only enter this space after the last pair of clamping jaws has been activated to hold an article.

11. An installation for treating articles as in claim 1 and comprising a conveyor with carriers for these articles and a supply and discharge station, while each carrier is adapted to receive n rows of articles and each discharge station is provided with means for combining these rows to an advancing single row, said installation comprising:

the discharge station provided with a number of parallel transit paths adjoining the periodically passing carriers of the conveyor;

each transit path having a length of a number of times the length of a carrier;

a moveable abutment being disposed at the end of each transit path;

all transit paths adjoining a common discharge path; and every transit path being provided with means for advancing continuously and at an accelerated speed on the common discharge path all articles available on the transit path.

* * * * *